United States Patent Office 3,231,588
Patented Jan. 25, 1966

3,231,588
3-SUBSTITUTED-16-MERCAPTO-
PREGNAN-20-ONES
Leland L. Smith, Malvern, Pa., and Daniel M. Teller, Wilmington, Del., assignors to American Home Products Corporation, New York, N.Y., a corporation of Delaware
No Drawing. Filed Oct. 5, 1962, Ser. No. 228,751
7 Claims. (Cl. 260—397.4)

This invention relates in general to novel and therapeutically useful steroids and methods for their preparation and use. More particularly, this invention relates to certain 3,21-disubstituted 16α-mercapto pregnanes and the 4-dehydro analogs thereof which have been found to exhibit valuable steroidal properties particularly as anti-inflammatory agents and anti-aldosterone agents capable in their latter function of reducing the sodium and fluid retention activity of other steroids of the aldosterone and mineralocorticoid type.

It is an object of the present invention therefore to present certain novel steroids having the capacity to act as an antagonist for any mineralocorticoid which exhibits sodium and fluid retention properties, and in this respect exhibit a diuretic activity.

The novel compounds of the invention may be represented by the following general formula:

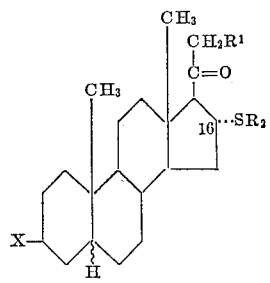

and the 4-dehydro analogs thereof wherein X represents a group such as a ketonic oxygen, hydroxy and lower acyloxy; $R^1$ may be a substituent such as hydrogen, hydroxy and lower acyloxy, preferably lower alkanoyloxy; $R^2$, on the other hand, is a substituent such as hydrogen or lower alkanoyl. In the above structure representing these novel compounds, whenever the hydrogen atom present at position 5 is not specifically designated as α or β both of those configurations are included, as is generally represented by the wavy line in the formula. The dotted bond indicated at position 16 represents the alpha configuration of the substituent.

Illustrative of the 3- and 21-acyloxy derivatives contemplated by the invention are such lower alkanoyloxy compounds as the formate, acetate, propionate, butyrate, isobutyrate, valerate, isovalerate, and caproate; substituted alkanoyloxy compounds such as β-cyclopentylpropionate, cyclohexylacetate, ethoxyacetate and phenylacetate; unsaturated alkanoyloxy compounds such as the acrylate and crotonate; aromatic aroyloxy compounds such as benzoate and toluate as well as derivatives of dibasic acids such as succinate and phthalate and of fatty acids such as undecanoate and laurate. The term lower alkanoyloxy thus employed includes acyloxy radicals of monocarboxylic and dicarboxylic acids containing up to 12 carbon atoms.

The 16-mercapto groups which comprise an important feature of these novel compounds may include such acylthioesters as the thioformate, thioacetate, and the like; substituted acylthioesters of the type represented by cyclopentylthiopropionate, phenylthioacetate and the like as well as thioesters of residues of dibasic acids such as the thiosuccinate and thiophthalate and of the thioesters of fatty acids containing $C_{12}$-$C_{22}$ carbon atoms. In general, the invention includes all those derivable products of suitable sulfur containing compounds which would attach a mercapto substituent to the 16-position of the steroid.

As indicated in the general formula above, the 3-position of these steroids may be substituted by a ketonic oxygen atom, a hydroxy group or an acyloxy group, as desired. This substitution results from the preparation and selection of a suitably substituted 16-dehydro-20-keto pregnane or pregnene as the starting material for the preparation of this novel series of 16-mercapto-pregnanes and mercapto-pregnenes.

In general the novel compounds of the invention may be prepared by the addition of a suitable mercapto compound, such as a suitable thioacid, alkyl mercaptan or hydrogen sulfide, to suitably substituted 16-dehydro-20-keto steroids to obtain the corresponding 16α-mercapto-20-keto pregnane or pregnene derivatives of the invention. The compounds if not initially unsaturated at position 4 may then be dehydrogenated by reactions known to the art to convert them to the 4-dehydro analogs thereof, if so desired. The addition reaction of the invention is generally carried out at temperatures less than 90° C. and greater than 20° C. for a variable reaction time generally ranging from about 5 minutes to 15 hours as particular solvents and reactants require. Although the reaction will proceed without a catalyst, a strong acid may be employed to increase the rate of reaction.

The mercapto compounds themselves such as the thioacid may be used as the solvent for the reaction, or if desired, other inert solvents such as chloroform, methylene chloride, tetrahydrofuran and the like may be employed with equally satisfactory result.

The reaction wherein the known starting material 16-dehydropregnane-20-one (I) is reacted with a suitable thioacid to prepare the corresponding 16-mercapto-20-one (II) may be illustrated by the following schematic:

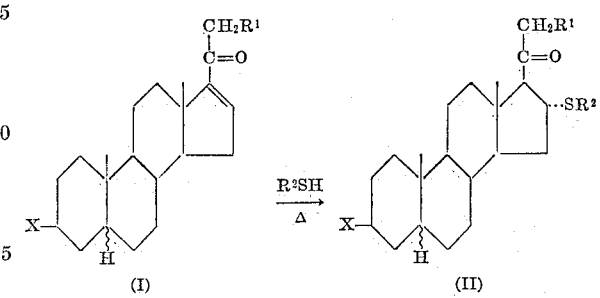

wherein X, $R^1$ and $R^2$ have the values above indicated and the reaction conditions are generally as described above. Alternatively, the 16-thioester may be prepared by treatment of the 16-dehydro-pregnane-20-one (I) with a suitable sulfur containing compound such as hydrogen sulfide to obtain the corresponding 16α-thiol (III) which is esterified by treatment with a suitable acylating agent such as acetic anhydride to form the acylated analog (II) such as 16α-acetylthio-3β-acetoxy-5β-pregnane-20-one in a case where X represents a β acetoxy group and S—R² represents a thioacetoxy group. This type of preparation may be represented generally by the schematic:

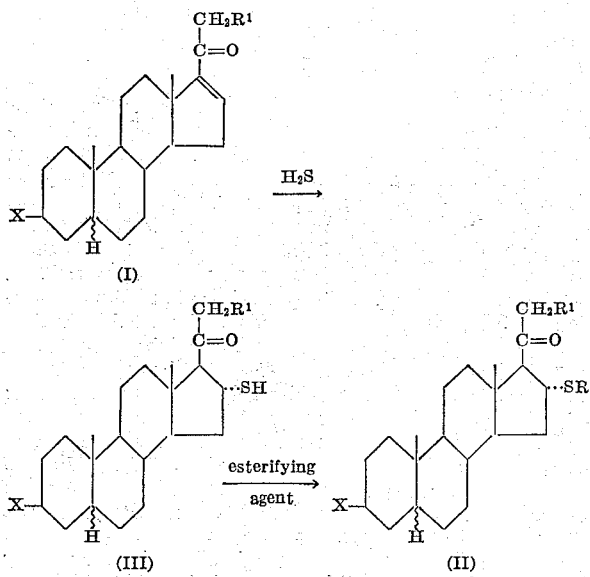

In the above reaction the symbols X, R¹ and R² have the meanings above set forth, and the solvents involved in preparing the 16α-thiol may be any suitable inert solvent such as pyridine, benzene, hexane, cyclohexane, toluene, chloroform, ethylidene dichloride, ethylene chloride, carbon tetrachloride, ethyl acetate, acetone and the like. The reaction time may vary up to 24 hours' duration when the treatment with a sulfur containing reagent, such as $H_2S$, is conducted at room temperature. The 16-acylation, particularly 16-acetylation, may preferably be accomplished in the presence of pyridine although other suitable basic solvents of this type may also be employed. The acylation reaction may vary in reaction time, but in most instances will proceed at temperatures up to the reflux temperature of the solvent for about 4 to 6 hours' duration.

As an alternative means of preparing these novel compounds, one may treat the 16-dehydro pregnane with a suitable halogenating agent such as a hydrohalic acid to obtain the 16-halogenated analog. This compound may be made the subject of a displacement reaction by treatment with an alkali metal salt of a thioalkanoic acid to form the novel 3-substituted-16-mercapto substituted-20-ones, which in this case could be the 16-thioester compounds. Still further, these novel compounds may be prepared by treatment of a compound such as 16-halo-3β-hydroxy-5β-pregnan-20-one with a mercaptan such as an alkali metal hydrosulfide to obtain the 16-mercaptan directly from the reaction. As an additional alternative procedure one may obtain the final products of the invention by reacting the 16-halo-3-substituted-5β-pregnane or pregnene-20-one with a suitable alkali metal thiocyanate to obtain the 16-thiocyanate analog which upon reduction with a suitable reducing agent such as hydrogen in the presence of a catalyst if desired to expedite reaction will reduce the 16-thiocyanate substituent to the corresponding alcohol giving a member of the series wherein the 16-substitution is a thiol group. These and perhaps other variants are of course within the scope of the invention as broadly conceived.

The novel compounds of this invention are capable of use therapeutically as the 21-alcohols or as suitable esters thereof. Certain useful esters, for example, would be the acetate, propionate, tertiary butyl acetate, substituted phenoxyacetates such as halogenated or alkylated, or alkyloxylated phenoxyacetates and also carbethoxylates thereof, water soluble esters like monosodium succinate, phthalate, sulfobenzoate, phosphate, sulfate and the like may also be prepared from the corresponding 21-hydroxy compound by treatment with suitable acylating agents such as the acid anhydride or acyl halide in such solvents as pyridine and the like.

It is of course to be realized that those compounds wherein R² is a lower alkyl group such as methyl, ethyl or the like obtained by treatment of a 16-dehydro-20-keto steroid with a lower alkyl mercaptan is within the broad concept of the invention, and in this respect would be considered to be equivalent thereto.

The compounds of the invention are useful in the field of experimental pharmacology as well as being valuable as intermediates for further use in the synthesis of new steroidal compounds. For example, the compound 21-acetoxy - 16α - acetylthio - 4 - pregnene - 3,20- - dione may be hydroxylated at the C–11 position with a variety of microorganisms, specifically *Curvularia lunata, Aspergillus ochraceus*, etc., to yield the 11β- or 11α-hydroxy derivative which on treatment with a mineral acid may be dehydrated to the corresponding $\Delta^{9(11)}$-anhydro steroid, 21 - acetoxy - 16α - acetylthio - 4,9(11) - pregnadiene-3,20-dione, which is a known steroid intermediate utilized in the synthesis of 16α-acetylthio substituted corticoids having anti-inflammatory activity. In addition, many of the compounds of the invention have been found to demonstrate aldosterone antagonism, anti-inflammatory activity, and general hormonal effect in those areas where cortical hormones are employed as indicated above. For example, co-administered with a steroid such as desoxycorticosteroid they in many cases inhibit the fluid and sodium retentions experienced in treatment with such steroids.

The novel compounds of the invention, where it is desired to employ them in pharmacological preparations, may be admixed if desired with a large number of compatible diluents, carriers and the like to form a pharmaceutical composition. Such well-known liquid carriers as mineral or vegetable oil or a lower aliphatic alcohol may be used where injectables are to be prepared. Glycerine or the like may be used where the compound is to be administered as a syrup. Such solid excipients, carriers, diluents, or the like such as carboxymethylcellulose, starches, sugars and the like may be added where tablets or powders are to be employed as a means of administration. The dosage of the compounds will vary and in general can vary from about 0.5 to 100 mg./kilo of body weight per day depending upon the many factors of the case involved.

The invention will appear more fully from the examples which follow. These examples are set forth by way of illustration only, and it will be understood that the invention is not to be construed as limited in spirit or in scope by the details contained therein, as many modifications in materials and methods will be apparent from this disclosure to those skilled in the art. In these examples, temperatures are given in degrees centigrade and quantities of materials in parts by weight.

EXAMPLE 1

21-acetoxy-16α-acetylthio-4-pregnen-3,20-dione

Stir a solution of 2.0 g. of 21-acetoxy-4,16-pregnadien-3,20-dione in 100 ml. of methylene chloride and 20 ml. of thioacetic acid at room temperature for three hours, then remove the solvent under vacuum. Crystallize and recrystallize the gummy residue from ethanol three times to obtain 1.0 g. of product, M.P. 161–162°. Chromatography on silica gel (elution with 5% ether in benzene) affords the analytical sample, M.P. 162–164°; $[\alpha]_D$ +94.8°; $\lambda_{max}$ 238 mμ ($\epsilon$ 19,400);

$\lambda^{KBr}_{max}$ 5.74, 5.79, 5.95, 6.03, 6.22, 8.17, 9.01, 10.71μ, etc.

*Anal.*—Calcd. for $C_{25}H_{34}O_5S$: C, 67,23; H, 7.67; S, 7.18. Found: C, 67.35; H, 7.39; S, 6.84.

The thioester reduces alkaline tetrazolium blue, gives a typical yellow fluorescence with isonicotinic acid hydrazide, and gives a blue color with phosphomolybdic acid. Nuclear magnetic resonance spectra include resonances at $\tau$ 9.30 p.p.m., 8.80 p.p.m., 7.88 p.p.m., 7.78 p.p.m., doublet at 5.55 p.p.m. and 4.40 p.p.m.

EXAMPLE 2

*21-acetoxy-16α-propionylthio-4-pregnen-3,20-dione*

Use the procedure of Example 1, except that 15 ml. of thiopropionic acid is substituted for 20 ml. of thioacetic acid, to convert 3.0 g. of 21-acetoxy-4,16-pregnadien-3,20-dione to 1.5 g. of crude 16α-thiopropionate, M.P. 118–121°. After chromatography on silica gel (elution with 5% ether in benzene) the pure thiopropionate may be obtained, M.P. 129–131°; $[\alpha]_D$ +61.5°; $\lambda_{max}$. 238 m$\mu$ ($\epsilon$ 18,500);

$\lambda_{max}^{KBr}$. 5.72, 578, 5.95, 6.02, 6.20, 8.15, 9.49, 10.65$\mu$, etc.

*Anal.*—Calcd. for $C_{26}H_{36}O_5S$: C, 67.79; H, 7.88; S, 6.96. Found: C, 67.81; H, 7.86; S, 6.88.

EXAMPLE 3

*16α-acetylthio-3β-hydroxy-5β-pregnan-20-one*

To a solution of 1.0 g. of 3β-hydroxy-5β-pregn-16-en-20-one in 50 ml. of methylene chloride add 10 ml. of thioacetic acid. After leaving three hours at room temperature, remove the solvents under vacuum and crystallize the residue from cyclohexane-petroleum ether, 300 mg., M.P. 127–129°. A second crop, 155 mg., M.P. 124–127°, may also be taken. After chromatography on silica gel (elution with 5% ether in benzene) the pure product is obtained, M.P. 127–129°; $[\alpha]_D$ +9°; $\lambda_{max}$. 233 m$\mu$ ($\epsilon$ 4,720);

$\lambda_{max}^{H_2SO_4}$ ($E_{1cm}^{1\%}$) (at 2 hr.): 286 m$\mu$ (42), 347 m$\mu$ (33), 382 m$\mu$ (31), 456m$\mu$ (26); $\lambda_{max}^{KBr}$. 5.84, 5.99, 6.91, 7.39 8.92 9.69, 10.45$\mu$, etc.

*Anal.*—Calcd. for $C_{23}H_{36}O_3S$: C, 70.36; H, 9.24; S, 8.17. Found: C, 70,52; H, 9.40; S, 7.70.

Nuclear magnetic resonance spectra include resonances at $\tau$ 9.38 p.p.m., 9.05 p.p.m., 7.96 p.p.m., 7.79 p.p.m., 7.40 and 7.62 p.p.m. and 5.95 p.p.m.

EXAMPLE 4

*16α-acetylthio-3β-hydroxy-5β-pregnan-20-one*

Reaction of 1.0 g. of 3β-hydroxy-5β-pregn-16-en-20-one in 2.0 ml. of neat thioacetic acid, with warming on the steam bath for 5 minutes, affords 740 mg. (60%) of crude thioester, M.P. 124.5–125.5°; $\lambda_{max}$. 233 m$\mu$ ($\epsilon$ 4,700).

EXAMPLE 5

*16α-propionylthio-3β-hydroxy-5β-pregnan-20-one*

Treat 3.0 g. of 3β-hydroxy-5β-pregn-16-en-20-one dissolved in 75 ml. of methylene chloride with 10 ml. of thiopropionic acid. After leaving three hours at room temperature remove the solvents under vacuum and crystallize the resultant gum from ethanol, from carbon tetrachloride, and twice from cyclohexane, obtaining 700 m.g. of product, M.P. 154–156°; $[\alpha]_D$ +17.7°; $\lambda_{max}$. 234 m$\mu$ ($\epsilon$ 4,770);

$\lambda_{max}^{KBr}$. 5.84, 5.97, 6.91, 8.88, 9.68, 9.94, 10.88$\mu$, etc.

*Anal.*—Calcd. for $C_{24}H_{38}O_3S$: C, 70.89; H, 9.42; S, 7.89. Found: C, 70.81; H, 9.46; S, 7.70.

EXAMPLE 6

*3β-acetoxy-16α-acetylthio-5β-pregnan-20-one*

Hold at room temperature for 30 minutes 3.0 g. of 3β-acetoxy-5β-pregn-16-en-20-one in 75 ml. of methylene chloride and 30 ml. of thioacetic acid, and isolate the product in the usual manner. After chromatography on silica gel (elution with 2% ethyl acetate in benzene) the pure product is obtained, 540 mg., M.P. 140–158°; $[\alpha]_D$ +18.3°; $\lambda_{max}$. 232 m$\mu$ ($\epsilon$ 4,500);

$\lambda_{max}^{KBr}$. 5.78, 5.85, 5.93, 6.92, 8.00, 8.03, 8.10, 8.83$\mu$, etc.

*Anal.*—Calcd. for $C_{25}H_{38}O_4S$: C, 69.08; H, 8.81; S, 7.38. Found: C, 69.47; H, 9.02; S, 7.36.

EXAMPLE 7

*3β-acetoxy-16α-mercapto-5β-pregnan-20-one*
*and*
*3β-acetoxy-16α-mercapto-5β-pregnan-20-one*

Bubble hydrogen sulfide through a solution of 3.0 g. of 3β-hydroxy-5β-pregn-16-en-20-one in 75 ml. of pyridine and 0.25 ml. of piperidine held at room temperature for 22 hours. Remove the solvents under vacuum, and crystallize the residue from acetone-cyclohexane, recovering 3.25 g. of material analyzable as an approximately equal mixture of the thiol and the disulfide by thin-layer chromatography. Chromatography on silica gel columns affords the thiol, eluted with 5% ethyl acetate in benzene; and the disulfide, eluted with 10% ethyl acetate in benzene. Both chromatographically isolated compounds will be identical with the completely characterized preparations obtained from oxidation and reduction of the thiol-disulfide mixture.

Recrystallize the thiol-disulfide mixture from cyclohexane containing 5% acetone and dissolve 1.2 g. of the recrystallized mixture in 300 ml. of refluxing glacial acetic acid; then add 600 mg. of zinc dust in portions (nitrogen atmosphere). After four hours of reflux cool the mixture, filter, and evaporate filtrate under vacuum. Dissolve the residue in benzene, wash with water, and dry over anhydrous magnesium sulfate. After evaporation of the benzene chromatograph the residue on silica gel. Elution with 5% ether in benzene gives 166 mg. of the thiol 3β-acetate, M.P. 128–130°;

$\lambda_{max}^{KBr}$. 5.78, 5.87, 8.02, 8.13, 9.79$\mu$, etc.

*Anal.*—Calcd. for $C_{23}H_{36}O_3S$: C, 70.36; H, 9.24; S, 8.17. Found: C, 70.16; H, 8.96; S, 8.40.

Further elution with 5% ether in benzene gives 120 mg. of the thiol, crystallized from hexane, M.P. 168–171°;

$\lambda_{max}^{KBr}$. 5.86, 6.91, 7.40, 970$\mu$, etc.

*Anal.*—Calcd. for $C_{21}H_{34}O_2S$: C, 71.95; H, 9.66; S, 9.15. Found: C, 71.83; H, 9.60; S, 8.80.

Both thiols give a violet red color with sodium nitroprusside solution and decolorize a carbon tetrachloride solution of iodine.

EXAMPLE 8

*3β-acetoxy-16α-acetylthio-5β-pregnan-20-one*

Acetylate 100 mg. of 3β-hydroxy-16α-mercapto-5β-pregnan-20-one with 1 ml. of acetic anhydride and 3 ml. of pyridine and after ten hours remove the solvents under vacuum, which gives 3β-acetoxy-16α-acetylthio-5β-pregnan-20-one, M.P. 154–157°, identical in infrared spectra and chromatographic behavior with the product obtained in Example 6.

EXAMPLE 9

*16α-acetylthio-3β-hydroxy-5β-pregnan-20-one*

Acetylate 100 mg. of 3β-hydroxy-16α-mercapto-5β-pregnan-20-one with 1.7 equivalents of acetic anhydride dissolved in three volumes of dry pyridine. After six hours remove the solvents under vacuum and crystallize the product from acetone and hexane, yielding the pure 16α - acetylthio - 3β - hydroxy - 5β - pregnan - 20 - one, identical with the product of Example 3.

EXAMPLE 10

*16α,16α'-dithio-bis(3β-hydroxy-5β-pregnan-20-one)*

Treat a solution of 400 mg. of the mixture of thiol and disulfide obtained in Example 7 dissolved in 100 ml. of benzene and 50 ml. of water with a solution of iodine in benzene until a slight excess is present. Then add aqueous sodium thiosulfate to destroy the excess iodine, separate the organic layer, wash with water, and dry over anhydrous magnesium sulfate. Evaporation of the solvent affords a gum which may be crystallized from benzene-hexane, yielding 140 mg. of disulfide, M.P. 171–178°;

$\lambda^{KBr}_{max}$ 5.90, 6.92, 7.40, 8.12, 9.71μ, etc.

*Anal.*—Calcd. for $C_{42}H_{66}O_4S_2$: C, 72.16; H, 9.52; S, 9.17. Found: C, 72.27; H, 9.28; S, 9.20.

EXAMPLE 11

*16α-acetylthio-3β-hydroxy-5α-pregnan-20-one*

To a solution of 0.6 g. of 3β-hydroxy-5α-pregn-16-en-20-one in 25 ml. of methylene chloride add 5 ml. of thioacetic acid. After 30 minutes remove the solvents under vacuum and crystallize the residue from carbon tetrachloride, obtaining 450 mg. of product, M.P. 164–168°. Recrystallization raises the M.P to 167–171°; $[\alpha]_D$ +11.8°; $\lambda_{max.}$ 233 mμ (ε 4, 630);

$\lambda^{KBr}_{max}$ 5.86, 5.91, 7.39, 8.87, 9.65, 10.52μ, etc.

*Anal.*—Calcd. for $C_{23}H_{36}O_3S$: C, 19.36; H, 9.24; S, 8.17. Found: C, 70.66; H, 9.21; S, 8.20.

EXAMPLE 12

*21-hydroxy-16α-acetylthio-4-pregnen-3,20-dione*

Stir a solution of 2.0 g. of 21-hydroxy-4,16-pregnadien-3,20-dione in 100 ml. of methylene chloride and 20 ml. of thioacetic acid at room temperature for about three hours. Remove the solvent under vacuum. Crystallize and recrystallize the gummy residue from ethanol three times to obtain 1.0 g. of the product of this example.

We claim:
1. A compound having the formula

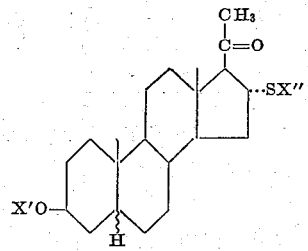

wherein X' and X" each represents a radical selected from the group consisting of hydrogen and lower alkanoyl.

2. A compound according to claim 1 in which X' is a hydrogen atom.

3. A compound according to claim 2 in which X" is a lower alkanoyl radical.

4. 16α,16α' - dithio - bis-(3β-hydroxy-5β-pregnan-20-one).

5. A 3β-hydroxy-16α-acylthiol-5β-pregnan-20-one.

6. 3β-hydroxy-16α-thiol-5β-pregnan-20-one.

7. 16α-acetylthio-3β-hydroxy-5β-pregnan-20-one.

References Cited by the Examiner

UNITED STATES PATENTS 2,912,443  9/1956  Dodson et al. _____ 260—397.3

LEWIS GOTTS, *Primary Examiner.*

IRVING MARCUS, *Examiner.*